US011212363B2

(12) United States Patent
Carlson et al.

(10) Patent No.: US 11,212,363 B2
(45) Date of Patent: Dec. 28, 2021

(54) DOSSIER INTERFACE AND DISTRIBUTION

(71) Applicant: MicroStrategy Incorporated, Vienna, VA (US)

(72) Inventors: Erin Kate Carlson, Seattle, WA (US); Luis A. Dector, Vienna, VA (US); Yi Du, Tysons Corner, VA (US); Joel Lebrun, Vienna, VA (US); Aaditya Navrekar, Vienna, VA (US); Michael J. Saylor, Vienna, VA (US); Ellen Wang, Vienna, VA (US); Xiaoyin Yang, Great Falls, VA (US); Jingbin Zhang, Great Falls, VA (US); Priya Samuel, Vienna, VA (US)

(73) Assignee: MicroStrategy Incorporated, Vienna, VA (US)

( * ) Notice: Subject to any disclaimer, the term of this patent is extended or adjusted under 35 U.S.C. 154(b) by 718 days.

(21) Appl. No.: 15/427,874

(22) Filed: Feb. 8, 2017

(65) Prior Publication Data

US 2020/0007644 A1 Jan. 2, 2020

Related U.S. Application Data

(60) Provisional application No. 62/292,617, filed on Feb. 8, 2016.

(51) Int. Cl.
*H04L 29/08* (2006.01)
(52) U.S. Cl.
CPC ............ *H04L 67/306* (2013.01); *H04L 67/06* (2013.01); *H04L 67/22* (2013.01)

(58) Field of Classification Search
CPC ....... H04L 67/306; H04L 67/06; H04L 67/22; H04L 65/403; G06Q 10/10;
(Continued)

(56) References Cited

U.S. PATENT DOCUMENTS 7,949,706 B2    5/2011   Malik
8,108,779 B1 *  1/2012   Rein ...................... G06F 16/40
                                                          715/743
(Continued)

OTHER PUBLICATIONS

U.S. Office Action in U.S. Appl. No. 15/956,546, dated Oct. 1, 2020, 24 pages.
(Continued)

*Primary Examiner* — Kevin T Bates
*Assistant Examiner* — Lesa M Kennedy
(74) *Attorney, Agent, or Firm* — Fish & Richardson P.C.

(57) ABSTRACT

Methods, systems, and apparatus, including computer programs encoded on a computer storage medium, for implementing a dossier interface and distributing the dossier are disclosed. In one aspect, a method includes the actions of receiving data identifying one or more documents to include in a dossier. The actions further include receiving a request to share the dossier with a first user. The actions further include providing a link to the dossier. The actions further include receiving a request to modify the dossier. The actions further include storing data that indicates the modification and maintaining the data identifying the one or more documents that represent the dossier. The actions further include receiving, from the first user, a request to share the dossier with a second user. The actions further include providing, to the second user, a link that identifies the dossier and the data that indicates the modification.

18 Claims, 12 Drawing Sheets

(58) Field of Classification Search
CPC .... G06F 21/6218; G06F 16/93; G06F 40/166; G06F 40/197; G06F 8/71; G06F 16/176
See application file for complete search history.

(56) References Cited

U.S. PATENT DOCUMENTS

| | | | | |
|---|---|---|---|---|
| 8,516,046 | B1* | 8/2013 | Xu | G06Q 10/10 709/204 |
| 9,276,749 | B2 | 3/2016 | Tenenboym et al. | |
| 9,774,561 | B1 | 9/2017 | Rapp et al. | |
| 10,366,079 | B1 | 7/2019 | Xiao et al. | |
| 2003/0080998 | A1 | 5/2003 | Gonzalez | |
| 2004/0205453 | A1 | 10/2004 | Mortensen | |
| 2006/0015818 | A1 | 1/2006 | Chaudhri | |
| 2008/0010378 | A1* | 1/2008 | Parker | G06Q 10/10 709/226 |
| 2008/0034314 | A1 | 2/2008 | Louch | |
| 2008/0177782 | A1* | 7/2008 | Poston | G06F 40/197 |
| 2008/0209078 | A1 | 8/2008 | Bates et al. | |
| 2009/0024944 | A1 | 1/2009 | Louch et al. | |
| 2010/0057646 | A1 | 3/2010 | Martin et al. | |
| 2010/0146385 | A1 | 6/2010 | Goulandris | |
| 2010/0146640 | A1 | 6/2010 | Wang et al. | |
| 2011/0126111 | A1 | 5/2011 | Gill et al. | |
| 2012/0296697 | A1 | 11/2012 | Kumar | |
| 2013/0110919 | A1 | 5/2013 | An et al. | |
| 2013/0117400 | A1 | 5/2013 | An et al. | |
| 2013/0139081 | A1 | 5/2013 | Alon et al. | |
| 2013/0212151 | A1 | 8/2013 | Herbach et al. | |
| 2013/0297588 | A1 | 11/2013 | Tyagi | |
| 2014/0040257 | A1 | 2/2014 | Chandrasekaran | |
| 2014/0067865 | A1* | 3/2014 | Kirigin | H04L 63/10 707/783 |
| 2014/0081903 | A1* | 3/2014 | Koosel | G06F 16/254 707/602 |
| 2014/0208215 | A1 | 7/2014 | Deshpande | |
| 2014/0227675 | A1 | 8/2014 | Budhu | |
| 2014/0229543 | A1* | 8/2014 | Allison | H04L 65/403 709/204 |
| 2014/0281873 | A1* | 9/2014 | Frew | G06F 11/30 715/229 |
| 2014/0337778 | A1 | 11/2014 | Armitage | |
| 2014/0337808 | A1 | 11/2014 | Armitage | |
| 2015/0134808 | A1* | 5/2015 | Fushman | H04L 67/22 709/224 |
| 2015/0172234 | A1* | 6/2015 | Triantos | G06Q 10/103 715/752 |
| 2016/0285818 | A1* | 9/2016 | Beausoleil | G06F 16/248 |
| 2017/0123397 | A1 | 5/2017 | Billi et al. | |
| 2017/0131856 | A1 | 5/2017 | Reyes et al. | |
| 2017/0177608 | A1* | 6/2017 | Cismas | G06F 16/176 |
| 2017/0286549 | A1 | 10/2017 | Chandnani et al. | |
| 2017/0300483 | A1* | 10/2017 | DeVincenzi | G06F 16/93 |
| 2018/0173372 | A1 | 6/2018 | Greenspan et al. | |
| 2018/0275845 | A1 | 9/2018 | Barbee et al. | |
| 2020/0007644 | A1 | 1/2020 | Carlson et al. | |

OTHER PUBLICATIONS

U.S. Office Action in U.S. Appl. No. 15/956,546, dated Jan. 15, 2020, 12 pages.

* cited by examiner

FIG. 1A

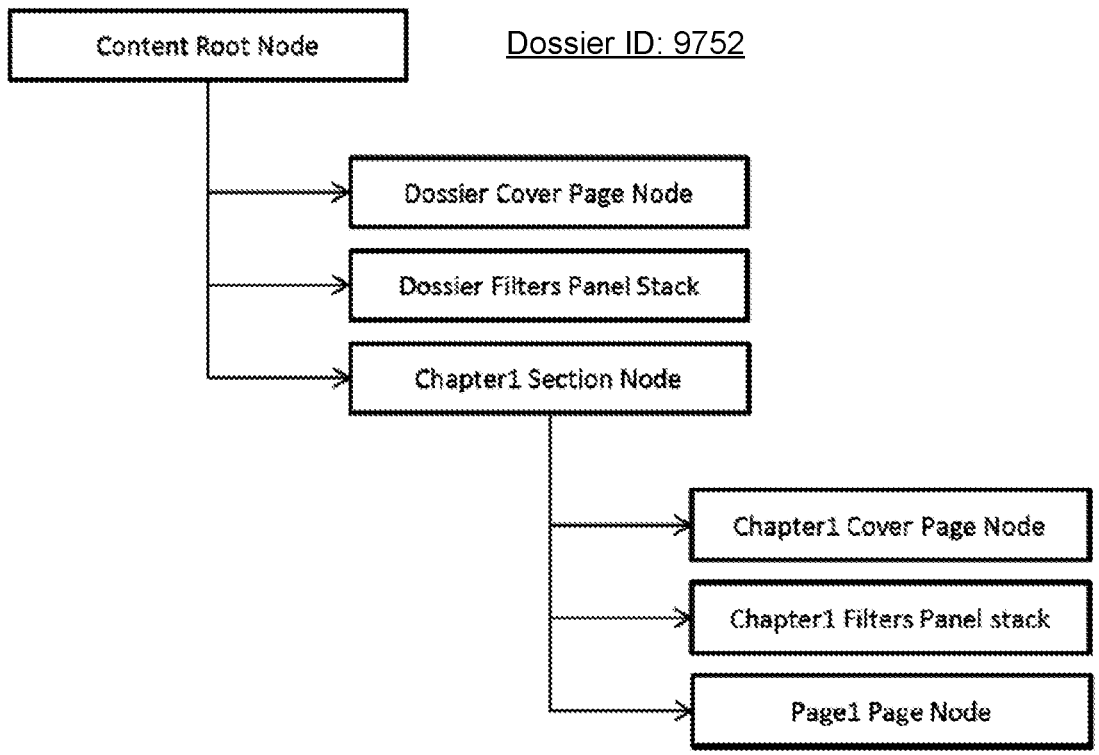
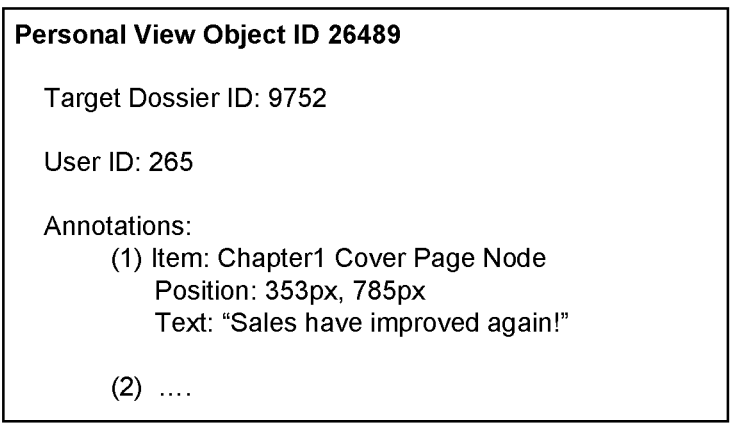
FIG. 5

| Business Group | Business Unit Owner | Business Unit | Employee | Title | Margin (SK) | Bookings (SK) | Cost |
|---|---|---|---|---|---|---|---|
| SLS-Northeast | Reyes, Ajitpal | SLS-Boston | Rayes, Ajitpal | Sales Director, Boston | (7) | 29 | |
| | | | Yu, Fanfan | Account Executive, New England | 566 | 603 | |
| | | | Garcia, Doris | Account Executive, Boston | 48 | 87 | |
| | | | Chandran, Nate | Account Executive | 0 | 0 | |
| | | | R___ | utive | 214 | 253 | |
| | | | D___ | s Engineer | 528 | 568 | |
| | | | Jose, Martha | Senior Sales Engineer | 721 | 765 | |
| | Schwarz, Arnold | SLS-New York 2 | Manuel, Terry | Account Executive | (1) | 0 | |
| | | | Schwarz, Arnold | Sales Director | 0 | 0 | |
| | Stallone, Sylvia | SLS-New York 2 | Stallone, Sylvia | Senior Sales Engineer | 384 | 422 | |
| | | | Carlson, Mike | Senior Account Executive | (31) | 0 | |
| | | | McNabney, Kevin | Area Vice President, Sales, NYC | (41) | 4 | |
| | | | Lang, Kevin | Senior Sales Engineer | 101 | 139 | |
| | | | Naik, Divya | Sales Engineer | 102 | 139 | |
| | | | Guo, Enrique | Senior Account Executive | 92 | 128 | |
| | | | Singh, Bala | Senior Account Executive | 237 | 277 | |

Jose Martha

FILTER SELECTIONS | Quarter 2015 Q3 2015 Q4 | Department: SALES CONSULTING | Business Group: SLS-NORTH EAST

FIG. 8

DOSSIER INTERFACE AND DISTRIBUTION

CROSS-REFERENCE TO RELATED APPLICATION

This application claims the benefit of U.S. Patent Application No. 62/292,617, filed on Feb. 8, 2016, the contents of which are incorporated by reference.

TECHNICAL FIELD

This disclosure relates to data processing and visualization.

BACKGROUND

A database is a collection of information that may include data, raw numbers, and text, and other similar data. Users may interact with and retrieve data from a database by querying the database. Users may share documents that include or illustrate data stored in the database.

SUMMARY

Techniques are described that allow users to compile reports, charts, tables and other information into a book-like package called a dossier published on an analytics platform. The dossier allows users to organize relevant information for a particular audience, and to arrange it in chapters that are easy to view on tablets and similar devices. The server can then publish the dossier to a group of users. The dossier interface allows users to interact with the data and customize the reports, e.g., by filtering data to update the reports, adding annotations, or initiating communication with other users directly from the dossier interface. Recipients of a dossier may not be able to add data sources or substantively edit beyond the adjustments allowed by the dossier. Users can save and share their filters and annotations and share them with other users. Also, changes or additions to the dossier by the owner (e.g., user that publishes the dossier) are propagated through to all dossiers derived from the master version.

According to an innovative aspect of the subject matter described in this application, a method for implementing a dossier interface and distributing the dossier and includes the actions of receiving, from a creating user, data identifying one or more documents to include in a dossier; receiving, from the creating user, a request to share the dossier with a first user; based on receiving, from the creating user, the request to share the dossier with a first user, providing, to the first user, a link to the dossier; receiving, from the first user, a request to modify the dossier; based on receiving, from the first user, the request to modify the dossier, storing data that indicates the modification and maintaining the data identifying the one or more documents that represent the dossier; receiving, from the first user, a request to share the dossier with a second user; and based on receiving, from the first user, the request to share the dossier with the second user, providing, to the second user, a link that identifies the dossier and the data that indicates the modification.

These and other implementations can each optionally include one or more of the following features. The actions further include receiving, from the creating user, a request to share the dossier with a third user; based on receiving, from the creating user, the request to share the dossier with the third user, providing, to the third user, a link to the dossier; receiving, from the third user, a selection of the link to the dossier; in response to receiving, from the third user, the selection of the link to the dossier, determining that the creating user shared the dossier with the third user; and based on determining that the creating user shared the dossier with the third user, providing, to the third user, the one or more documents and not the modification. The actions further include receiving, from the second user, a request to share the dossier with a fourth user; based on receiving, from the second user, the request to share the dossier with the fourth user, providing, to the fourth user, a link to the dossier; receiving, from the fourth user, a selection of the link to the dossier; in response to receiving, from the third user, determining that the creating user shared the dossier with the first user, that the first user shared the dossier with the second user, and that the second user shared the dossier with the fourth user; and based on determining that the creating user shared the dossier with the first user, that the first user shared the dossier with the second user, and that the second user shared the dossier with the fourth user, providing, to the fourth user, the one or more documents and the modification.

The actions further include receiving, from the creating user, data identifying an additional document to include in the dossier. The action of providing, to the second user, the one or more documents and the modification includes providing the one or more documents, the additional document, and the modification. The action of storing data that indicates the modification and maintaining the data identifying the one or more documents that represent the dossier includes storing data indicating that the first user provided the request to modify the dossier. The actions further include, in response to receiving, from a creating user, data identifying one or more documents that represent a dossier, storing data indicating that the creating user created the dossier. The modification includes filtering or annotating. The one or more documents are dashboards that include visualizations of analytics performed on unstructured data. The actions further include receiving, from the second user, a selection of the link to the dossier; and in response to receiving, from the second user, the selection of the link to the dossier, providing, to the second user, a view of the dossier having the modification of the first user applied to the dossier. The modification includes filtering. The actions further include receiving, from the second user, a selection of the link to the dossier; and, in response to receiving, from the second user, the selection of the link to the dossier, providing, to the second user, a view of the dossier having the filter of the first user applied to the dossier.

Other implementations of this aspect include corresponding systems, apparatus, and computer programs recorded on computer storage devices, each configured to perform the operations of the methods.

The subject matter described in this application may have one or more of the following advantages. Users able to share dossiers with other users who can view and filter the underlying data without the other users needing to log into the data store that includes the underlying data. Allowing access to the underlying data while limiting the number of users who are able to log into the data store, improves the security of the data store. The system allows users to annotate a dossier, or update a dossier such as with their own filtering on the data. The system stores annotations from different users, or the update actions such as data filtering, separately from the dossier instead of storing each annotated or updated dossier. By only storing the dossier once and then annotations or update from each annotating or updating user, the system reduces the need for additional memory and storage space.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 1A and 1B illustrate example dashboards.

FIG. 5 illustrates example implementations of a dossier.

FIGS. 6-10 illustrate example dossier interfaces.

DETAILED DESCRIPTION

Figure 1:
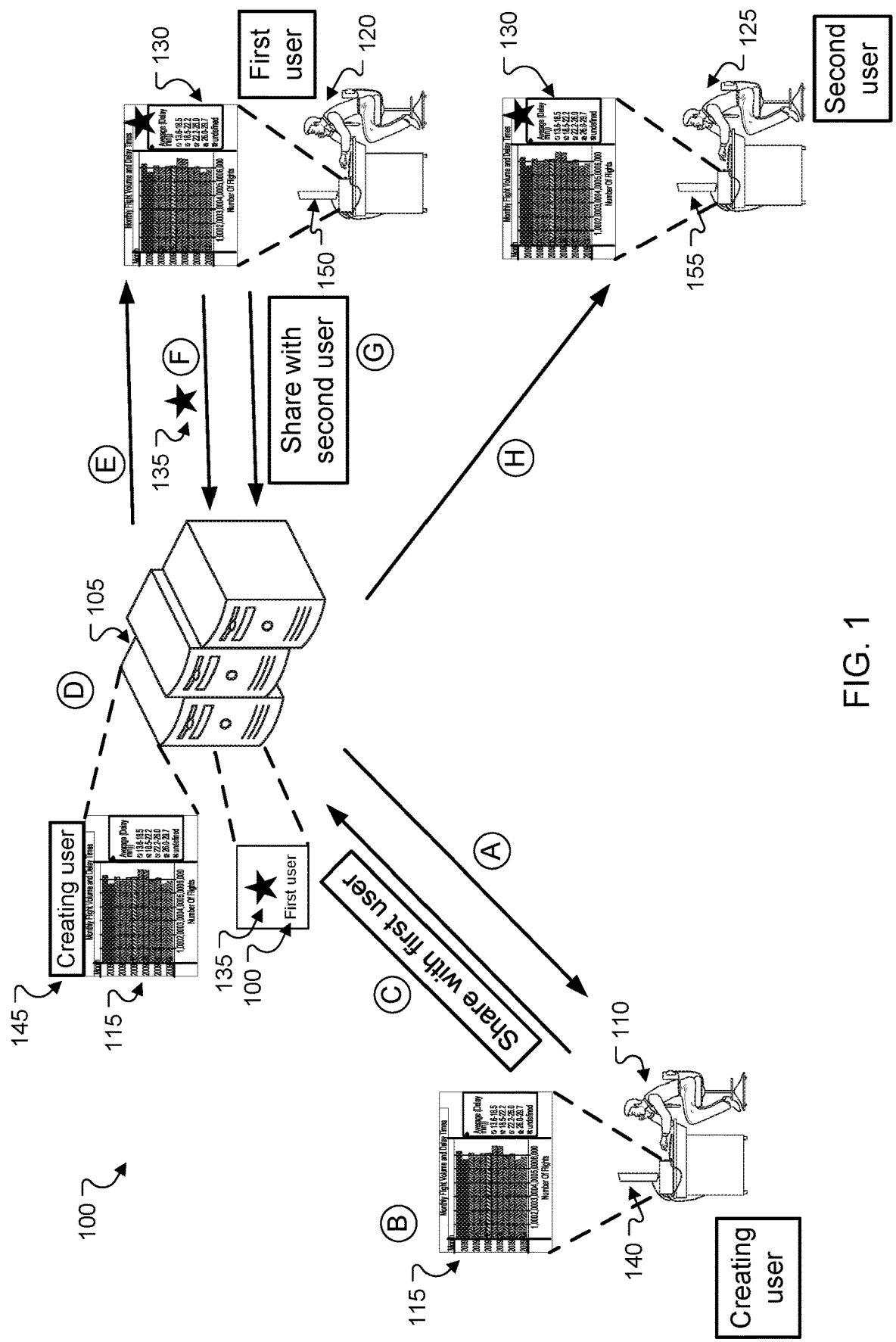
FIG. 1 is a diagram of an example system for creating and distributing a dossier.

FIG. 1 is a diagram of an example system 100 for creating and distributing a dossier. Briefly, and as described in more detail below, the system 100 includes a server 105 that allows a creating user 110 to share a dossier 115 with a first user 120. The first user 120 can review and annotate the dossier and share the annotated dossier 130 with a second user 125. The server 105 stores the annotation 135, and the second user 125 can view the annotated dossier 130.

A dossier is a defined collection of documents or interfaces that can be distributed or shared with other users. The dossier generally includes a user-selected grouping of interfaces, such as documents, dashboards, reports, or other objects. These object can be presented with a specified layout, formatting, or sequence defined by the creating user. These interfaces can include interactive elements, such as filters and other controls, that have behavior specified by the user that creates the dossier. In this manner, the dossier can be viewed and interacted with similar to an application. The dossier can include data connecting the elements to live data sources. For example, a dossier may include data connecting a chart, table, or map shown in a dashboard of the dossier to a data set provided by a database server. The chart, table, or map can be updated so that users can be shown the current information from the database each time they view the dossier. Of course, a dossier may include or reference a static data set, and filters or other controls may operate on the static data set. Similarly, pre-generated content elements that do not change can also be presented.

Dossiers can have a variety of characteristics. In some implementations, a dossier defines a closed set of elements or data sources. For example, a recipient of a dossier may be able to filter or manipulate data from data set that the creating user specified, but the recipient may be restricted from adding new data sources to the dossier. Sharing a dossier may grant the recipient access to a data source for viewing and use within the dossier.

A dossier may permit a user to make a variety of changes, and may also restrict some changes to the dossier. Once a dossier is shared, different versions of the dossier may be created, each linking back to the original, master version. In some implementations, different versions are tracked and stored by a server system in association with different user accounts. As a result, a user may view, annotate, or share his own version of a dossier from multiple different devices. Local copies of dossiers may be stored, annotated, or shared, and these local copies may be synchronized with copies stored by the server system. A dossier may be closed so that recipients are restricted from changing the structure of the dossier, for example, they cannot add new interfaces, documents, or interactive elements to the dossier, although the dossier may still permit the addition of annotations or the use of controls that the creating user has included. Alternatively, a dossier may have an open structure so that recipients may append additional elements such as pages, dashboards, etc.

Among the changes that users may be able to make are the addition of annotations, for example, the addition of comments, highlights, graphics, and so on. Similarly, users may be able to apply redactions or deletions. For example, a recipient of a dossier showing sales data for a region may focus a version of the dossier on only a portion of a region by reordering or deleting pages and filtering data sets to include data for a particular location in region, so that charts and tables are updated to show the information for the particular location. The user can then pass on the annotated or modified version to other users.

A dossier may have a state that is persistent for individual users. Current state characteristics can be stored for each user's version of the dossier, e.g., at a server and/or locally at a user device. As a result, when a user applies filter settings using a control within the dossier, those settings are retained after the dossier is closed and reopened, and will be passed on to other users if the user shares the dossier.

Referring to FIG. 5, in some implementations, the dossier is structured as a hierarchy or tree of objects 550. As illustrated in the figure, the dossier can have a content root node which is associated an identifier, which will be referred to as a dossier ID. Interfaces may be defined for the dossier as, for example, chapters and pages within chapters. The content root node may include information indicating each of the document elements at the next level of the hierarchy, e.g., different chapters. In some implementations, the content root node may include data indicating the structure of the entire tree.

Different levels of the hierarchy 550 may each link to different elements of the dossier. Examples include a (i) "page node", (ii) a "filters panel stack," and a (iii) "section node." The cover page may provide an initial view or overview of a given level of the hierarchy, e.g., for the dossier as a whole or a more specific section. The "filters panel stack" represents interactive elements and their settings. Each level of the hierarchy may have associated interactive controls. Some controls, linked to the root node, may act on the entire dossier, for example, to filter a data source across all chapters and pages. These filters may be considered more of a global filter as they filter across all chapters and pages. Other controls may operate in more limited areas of the dossier, for example, on specific chapters, pages, regions of pages, or specific elements within pages. These filters may be considered local filters as the filter operates on specific elements. Thus, the behavior of controls can be defined independently for each level of the hierarchy that forms the dossier. The page node may represent a specific view or user interface. The position of page nodes in the hierarchy indicates the sequence that views are shown to the user.

In some implementations, elements of the dossier are stored as server objects, for example represented by XML code or other data structures. Each object has a unique identifier, so that the structure of the dossier can be defined by links between the objects. The overall structure of the dossier may be fixed by the user that creates the dossier. Each user that receives the dossier may have a user identifier assigned.

Annotations or changes that each individual user makes are stored in a separate annotation object or document. For example, a personal view object 560 can be created for each user that annotates or interacts with the dossier. In fact, the same user can have multiple personal view objects to show different versions of the same dossier. Personal view object may be created automatically in response to a user's interaction with the dossier, or manually, such as when the user indicates that his annotations should be saved. Each personal view object 560, is assigned a unique identifier, as are the other objects in the system. The personal view object 560 includes, for example, the dossier ID that the object 560 corresponds to, a user ID for the user that created the personal view, and annotations to the original dossier represented by the hierarchy 550. The annotations may indicate, for example, state of filters or other controls, added text or graphics, removed areas or sections of the dossier and so on. In some implementations, individual annotations may be represented as different objects. In the example, the annotation data indicates a portion of the dossier, in this case, a specific page node, where the annotation is applied, as well as a location in the page and text to be displayed at the location.

When a user shares his version or view of the dossier, the system sends a reference or link that includes both the dossier ID and the personal view object ID. This allows the recipient's device to display the master dossier version and to apply the annotations or other changes indicated by the personal view object of the sender. In this manner, many versions of the dossier can be circulated with personal annotations, without altering the original version.

Changes to a dossier by the creating user are automatically propagated to any recipient of the dossier. Because the dossier is maintained by the server, each time a user views a dossier, the server can provide an updated copy of the master version, and then apply any annotations from a personal view object. Changes to personal view objects may also be propagated to others. Because annotations are tied to the personal view object, if User A's personal view object is updated with new annotations, User B's device will obtain the most recent annotations from the personal view object and apply them, even if User A previously shared the dossier before making the annotations.

In some implementations, users who receive an annotated version of a dossier may build on the changes indicated in the personal view object with their own personal view object. A personal view object may reference a personal view object of another user. For example, the personal view object for User B may show changes relative to the personal view object of User A, which show changes relative to the master version of the dossier. Alternatively, User B's personal view object may be decoupled from the personal view object of User A by simply creating a copy of the annotations existing at the time User B's personal view object is created and not referencing the personal view object for User A.

When a creating user creates a dossier, the server 105 creates a link to each of the documents that the creating user selects for the dossier. The documents may be a dashboard that includes illustrations of live data sources stored in databases. In instances where the documents include links to live data sources, the dossier may also include direct links to those data sources. The server 105 may define a hierarchy of the documents in the dossier according to a structure provided by the creating user. The hierarchy may include chapters that each have their own documents and data sources as well as limitations and permissions selected by the creating user. In some implementations, a different dossier may include different links to the same live data sources as another dossier. In this instance, the data of the live data sources does not change based on the dossier that is accessing the data. The accessing dossier may capture a snapshot of the data source and operate on the snapshot in instances where some of the data may be manipulated.

Each chapter of a dossier may include links to multiple dashboards, links to data sources for each of the dashboards, and permissions that are set by the creating user. The permissions may include a list of users who can access the chapter, a list of filters that users can apply to the dashboards or data sources, or a list of the documents or items on each document that users can annotate. Each chapter may also include data related to users who interacted with the chapter. A user may add annotations to documents such as comments or highlighting. In this instance, the server 105 adds data to the chapter to indicate that a particular user added an annotation. A creating user may add a filter to the documents. Similar to the annotation, the server adds data to the chapter to indicate that the user added a filter to the document and identifies the filter applied and the data source to which the filter applies.

Any modifications performed by viewing users do not change the original dossier. The only changes are to the chapters or documents where the modifications are added. When the server 105 records an annotation or modification by a user, the server 105 may also note the state of the dossier. The state may include the illustration viewed by the user and the underlying data when the user added the annotation. Because a filter or annotation added by a user may only make sense when the data is in a particular state, the dossier may add data to the annotation to indicate the state. As an example, a user may make a comment related to sales data. The sales data displayed in the document may be the current sales data such that any viewer of the document views the most recent sales data. A commenting user may leave a comment related to the sales at a particular time. The server may store the state of the sales data along with the user's comment in the annotation added to the document. As noted above, annotations and state of a dossier may be stored in a personal view object. This means that only users that view the dossier with that personal view object see the annotations. In other words, although many users may be making annotations to a dossier, all recipients of the original dossier will still see the original version without annotations.

The creating user may forward the dossier to users who may not have access to the underlying data sources or to the application used to access the underlying data sources. In this sense, the dossier provides a standalone way for a user to access the underlying data sources without the specific credentials used to access the underlying data. When viewing the dossier, the user can interact with the underlying data but is unable to add new data sources Referring to FIG. 1, to begin creating and sharing a dossier, the creating user 110 accesses the server 105 through computing device 140. The server 105 provides access to a data analysis server. The data analysis server may be included within the server 105 or may be separate from the server 105. The data analysis server analyzes raw data such as tables, documents, spreadsheets, databases, or any other type of electronic file. The data analysis server provides a metadata layer between the server and a data storage device and allows a user to generate files and interfaces that illustrate the contents of the raw data. The computing device 140 may be any type of device that is configured to interface with the server 105. For example, the computing device 140 may be a desktop computer, laptop computer, tablet, mobile phone, or any similar device.

At stages A and B, the creating user 110 interacts with the server 105 through the computing device 140. The server 105 provides access to the data analysis server and builds the hierarchy for the dossier as the creating user 110 defines dashboards and documents for the dossier. The server 105 adds links to the dossier 115 based on the underlying data that is references by the dashboards and documents. The server 105 adds data identifying users with whom the creating user 110 shares the dossier 115 and any permissions or restrictions placed on each user by the creating user 110. As noted above, a dossier is a collection of documents that are stored at a centralized location. A creating user selects the documents for a dossier by interacting with a server that stores the documents. The documents may be any type of document such as word processing documents, spreadsheets, presentations, video files, audio files, emails, reports, or any other types of document. The creating user may also create a document to include in the dossier. One particular example of a document that the creating user can create is a dashboard, as described above. The user may create one or more dashboards to include in a dossier. The dashboard may include visuals that represent analytics performed on data stored on a server. The server, or another server, may store the dossier as a file that includes a series of links to the documents. Each document may include links to the underlying data displayed in the document.

The creating user may organize the documents in the dossier so that a viewing user sees the dossier in a particular order. The creating user may place certain documents in chapters where each chapter is a file that includes links to the documents in that chapter. A dossier may be viewable outside of an application or device type where the creating user created the dossier. For example, the creating user may have created the dossier within an analytics application on a desktop computer. The dossier may be viewable by a user using a dossier viewing application on a tablet or mobile phone.

The creating user may also select the users to whom to distribute the dossier. Each selected user who receives the dossier from the creating user is able to view and interact with the dossier. The receiving user can browse the documents in each chapter view the content of each document. In some implementations, the creating user may select chapters that each receiving user can view. For example, the creating user may select that a first receiving user can view chapters 1, 3, and 4, and that a second receiving user can view chapters 2 and 4. In this instance, the dossier is still stored on the server and includes links to the documents for each chapter. Additionally, the dossier includes information to identify the users who can view particular chapters. Chapters 1, 3, and 4 include data that indicates that the first receiving user can view the respective chapter. Chapters 2 and 4 includes data that indicates that the second receiving user can view the respective chapter.

When a receiving user interacts with the documents of the dossier, the receiving user can annotate and comment on the data presented in each of the documents. The receiving user may not be able to edit the contents of the dossier, but rather highlight particular content. When a receiving user adds an annotation to a dossier, the server add a link in the dossier to a document that describes the annotations. The link also includes information identifying the receiving user who added the annotation and a list of users who can view the annotation. In some implementations, the list of users who can view the annotation includes the creating user who created the dossier and any users with whom the annotating user shares the dossier. Typically, the annotations would not viewable by other receiving users who received the dossier from the creating user.

As an example, Cindy creates a dossier that includes two chapters. The first chapter includes dashboard documents related to sales for the western U.S. The second chapter includes dashboard documents related to sales for the eastern U.S. Cindy shares the dossier with Rick and Alice. Rick views the dossier and adds an annotation to one of the dashboards related to sales in the western U.S. Rick's annotations are viewable by Cindy, but not viewable by Alice. Rick shares the dossier with Nancy. Nancy can view the dossier with Rick's annotations. Alice is still able to view the dossier as originally created by Cindy. If Cindy makes any changes to the dossier, then those changes are viewable by all users.

Once the creating user 110 creates the dossier 115, the creating user 110 chooses to share the dossier 115 with the first user 120 at stage C. At stage D, the server 105 stores the dossier 115 and creator data 145. The creator data 145 identifies the creator of dossier 115. As described above, the dossier 115 may be a collection of links to other documents. In this instance, the dossier 115 may also include a link to data identifying the creating user 110, such as the creating user's electronic credential that is stored on a credential management system. The dossier 115 may also include other types of metadata such as a creation date, last access, last user to access, last update date, or other relevant data.

Because the creating user 110 chose to share the dossier 115 with the first user 120, the server 105 also stores data identifying the first user 120 in or linked with the dossier 115. For example, the dossier 115 includes links to other documents and also a list of users with whom the creating user 110 chose to share the dossier 115. The server 105 may provide an indication to the first user 120 that the creating user 110 shared the dossier 115 before the first user 120 accesses the server 105. Alternatively, the first user 120 may log into the server 105, and then the server 105 provides indication to the first user 120 that the creating user 110 shared the dossier 115.

The first user 120 accesses the server 105 through computing device 150. The computing device 150 may not be the same type of device as computing device 140. The computing device 150 may also not run the same type of software the creating user 110 used to create the dossier 115. The first user 120 may use a viewing type of software that allows the first user 120 to interact with, filter, and annotate the dossier 115 but not edit the content of the dossier 115. At stage E, the server 105 provides the dossier 115 to the computing device 115. The first user 120 may filter the data shown in the dossier 115 and add an annotation 160 to create an annotated dossier 130. The annotated dossier 130 includes the same data as the dossier 115 plus any comments or additions that the first user 120 added.

At stage F, the computing device 150 transmits the annotation 135 to the server 105. The server 105 stores the annotation 135 along with data 160 that indicates that the first user 120 created the annotation 135. The annotation 135 also includes data indicating the dossier 115 that the annotation 135 is associated with. Alternatively, or in addition, the dossier 115 may include data identifying the annotation 135. The annotation 135 may also include data that indicates a date and time that the first user 120 created the annotation, the location within the dossier 115 where the annotation 135 should be placed. In some implementations, the annotation 135 is not a graphical item, such as a comment box or highlighting, added to the dossier 115. Instead, the annotation 135 is an additional item added to the dossier 115 that uses the same underlying information as the dossier 115. For example, the dossier may include a chart for sales data for each state during 2015. The first user 120 may want to highlight the states in the western U.S. The first user 120 could highlight those entries in the chart, or the first user could filter out the eastern states and add a new chart that only includes the western states. The first user 120 could place the western states chart adjacent to the original chart or add a button that a user selects to view the focused chart.

At stage G, the first user 120 chooses to share the annotated dossier 155 with a second user 125. The server 105 receives the share request from the first user 120 and stores data indicating that the first user 120 selected to share the annotated dossier 155 with the second user 125. The data may be stored with the dossier 115. For example, the server may add data to the dossier 115 that indicates the first user 120 shared the annotated dossier 130 with the second user 125. In some implementations, the first user 120 may only share the dossier 115 if the first user 120 adds an annotation 135. In some implementations, the first user 120 may share the original dossier 115.

The second user 125 receives an indication that the first user 120 shared the annotated dossier 130 with the second user 125. The second user 125 may receive the indication in a similar fashion to the first user 120 receiving the indication that the creating user 110 shared the dossier 115. The second user 125 accesses the server 105 through computing device 155. The computing device 155 may be a device that is similar to device 140 or device 150 or another type of computing device.

In stage H, the server 105 provides the annotated dossier 130 to the computing device 155. The server 105 receives data from the computing device 130 indicating that the second user 125 has requested to view the annotated dossier 130. The server 105 accesses the dossier 115 and identifies data that links to the annotation 135. The data indicates that the first user shared the annotated dossier 130 with the second user 125. Once the server 105 determines that the first user 105 has shared the annotated dossier 130 with the second user 105, the server 105 access the annotation 135, combines the annotation 135 with the dossier 115, and provides the annotated dossier 130 to the computing device 155. The second user 125 may then share the annotated dossier 130 or interact with the annotated dossier 130 to include the second user's own annotations. The second user may then share the updated dossier with other users.

In some implementations, the creating user 110 may make changes to the dossier 115 after sharing the dossier 115. For example, the creating user 110 may add another dashboard or document to the dossier 115 or modify one of the dashboards or documents included in the dossier 115. When the creating user 110 provides the revisions to the server 105, the server 105 may modify the original dossier file. By editing the original dossier file, when the first user 120 and the second user 125 view the dossier 115 or the annotated dossier 130, the first user 120 and the second user 125 will be viewing the edited dossier not the original dossier 115. In some implementations, these updates happen in real time. For example, if the first user is viewing the dossier 115 or the annotated dossier 130, any updates to the dossier added by the creating user 110 may appear as the creating user 110 saves the changes. Similarly, when the first user 120 adds any more annotations or updates any annotations, the second user 125 sees those updates, possibly in real time.

Because each user can manipulate and annotate a dossier according to the permissions set by the creating user, different users may have different personal views for a same dossier. The personal view contains a reference to a target object, such as a dossier. The personal view object stores the personalized view, so the object will contain a current page key and dossier modification information. The dossier version identifier is also added into the personal view object. When a viewer executes a dossier through a personal view, the system compares the dossier version identifier in the personal view with the dossier version identifier in the main dossier file, and only when the two identifiers are equal, the system applies the current page key and modification information to the dossier. Otherwise, the system clears the current page key and the modification information.

Furthermore, since in client side and to illustrate that the user has shared the dossier to the current viewer, the system adds a reference to the source user in the shortcut object. Then, the system also adds an extra graphical interface identifier in the personal view to record its source personal view if a shortcut object is copied from another personal view, then the system retains the other persona views identifier in the shortcut object. The personal view also includes that the is related to the interface of the cover page of the personal view, the last time the personal view was viewed, and the last time the personal view was modified. The system updates the data for the last time the personal view was modified each time the user modifies the personal view.

As noted above, the dossier creator can share the dossier with other users. Before the creator shares the dossier with another user, a client side device ensures the dossier is saved. In some implementations, the client may send comments to the server to save an XML document and a command to save the dossier as an object.

When a user shares the dossier with a receiving user, the receiving view the dossier by opening a link shared by the sharing user. When the receiving user opens the link, the client device sends a command that includes an object identifier for the dossier, a shortcut identifier, and a server address. When the server receives the command, the server may identify the shortcut to the dossier from the receiving user's list of available dossiers. If the shortcut does not exist, then the server makes a copy of the original shortcut and saves it to the receiving user's list of available dossiers. Executing the dossier executes the current page key and dossier modifications.

The receiving user can share the dossier with other users. When the receiving user manipulates the dossier, the manipulations will be automatically recorded and saved in the shortcut object. When viewer wants to share the personalized view with other viewers, the server copies the shortcut from receiving user's shared dossier folder to receiving user's shared dossier folder. The command may include several identifiers such as a shortcut identifier, an object identifier, and other identifiers and keys. The server receives the command and locates the shortcut based on the shortcut identifier, copies the shortcut identifier, changes the receiving user to the new user, and adds the shortcut identifier to the new user's dossier folder. The server returns the new shortcut identifier to the client device so the client device can build a link.

Figure 1A:
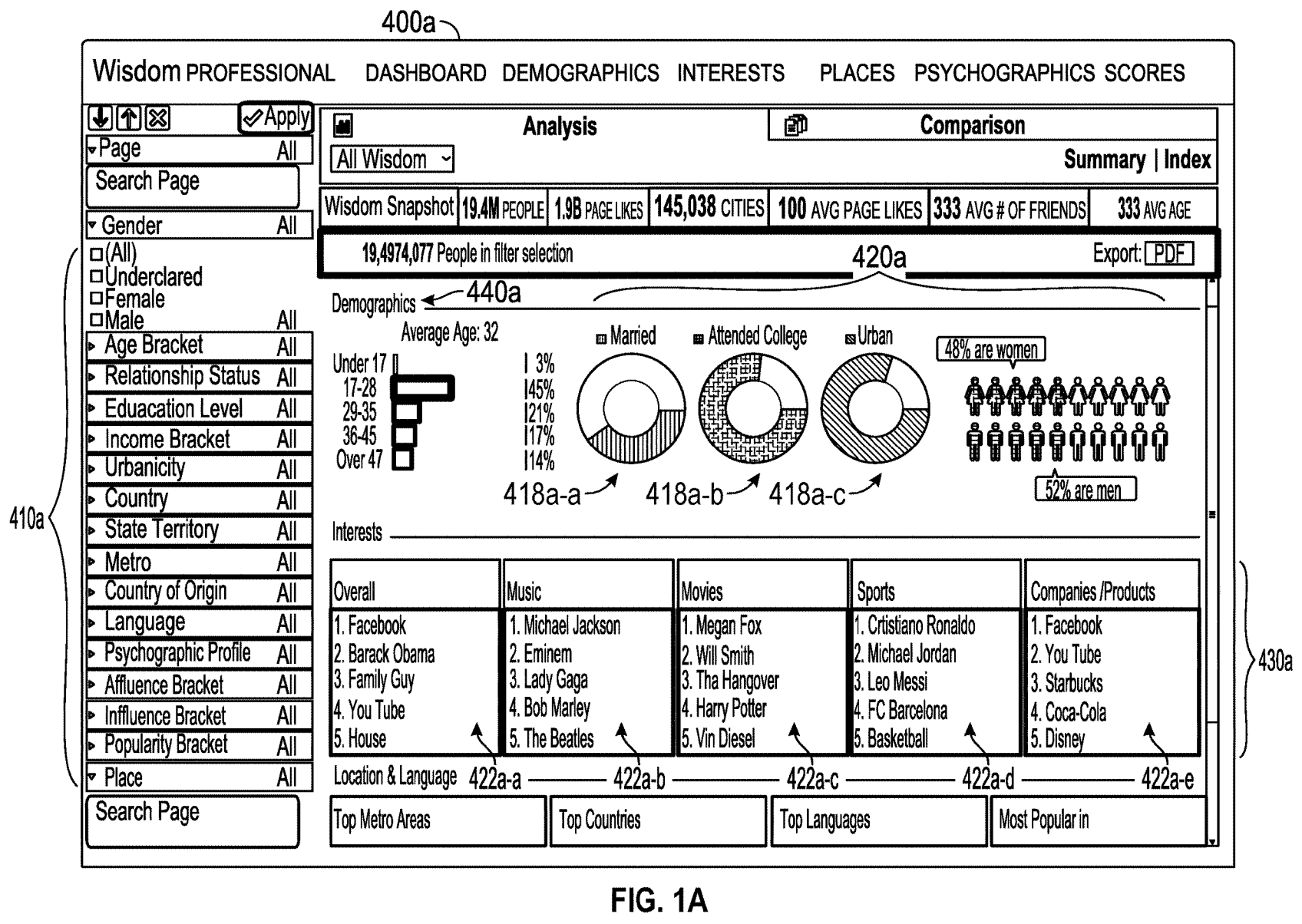

FIG. 1A illustrates an example user interface 400a of a dashboard interface. As shown, interface 400a comprises a plurality of control objects 410a-440a. For example, control objects include grids (e.g., data displayed in table format), graphs, text fields, shapes, etc. that users can use to navigate through the data presented through interface 400a. Interface 400a can be powered by the in-memory analytic data store described throughout this disclosure. In this regard, in some implementations, the analytic data store powers an extensive market intelligence network that provides the data shown in user interface 400a. For example, computer systems implementing the techniques described herein uses information about an application and/or design aspects of dashboard 400a to generate queries to the in-memory data store.

For example, all of the market intelligence data used by and displayed through the intelligence dashboard interface 400a can be loaded into the in-memory analytic data store. In this example, user interface 400a receives user input defining filter criteria 410a related to the market intelligence information a user seeks. Filter criteria 410a can include demographics data or any other type of data as shown in interface 400a or otherwise available to filter the market intelligence data stored in the in-memory analytic data store. For example, the user may be able to filter the data by gender, age, relationship status, education level, income bracket, urbanicity, etc. A query execution engine can receive the user input defining filter criteria 410a, and execute queries to access the market intelligence data stored in an in-memory analytic data store. In some examples, the query execution engine can receive the accessed data, perform analytics on the accessed data, and output the results of the analytics to user interface 400a.

As shown in FIG. 1A, the user interface 400a specifies the demographic data used to generate the dashboard output broken down into various categories 420a (e.g., as shown in charts 418a-a, 418a-b, and 418a-c) and outputs ranked lists of interests 422a-a to 422a-e for people that fall within the demographic profile 440a defined by the filter criteria 410a. For example, the categories 420a can include what percentage of the relevant population is married, has attended college, or lives in an urban area. Other types of output and data visualization can be used. In addition, the user interface 400a can receive additional user input to refine or change the filter criteria 410a or the results sought and the user interface 400a can dynamically update in short order given the in-memory data retrieval and processing that occurs responsive to the additional user input.

Figure 1B:
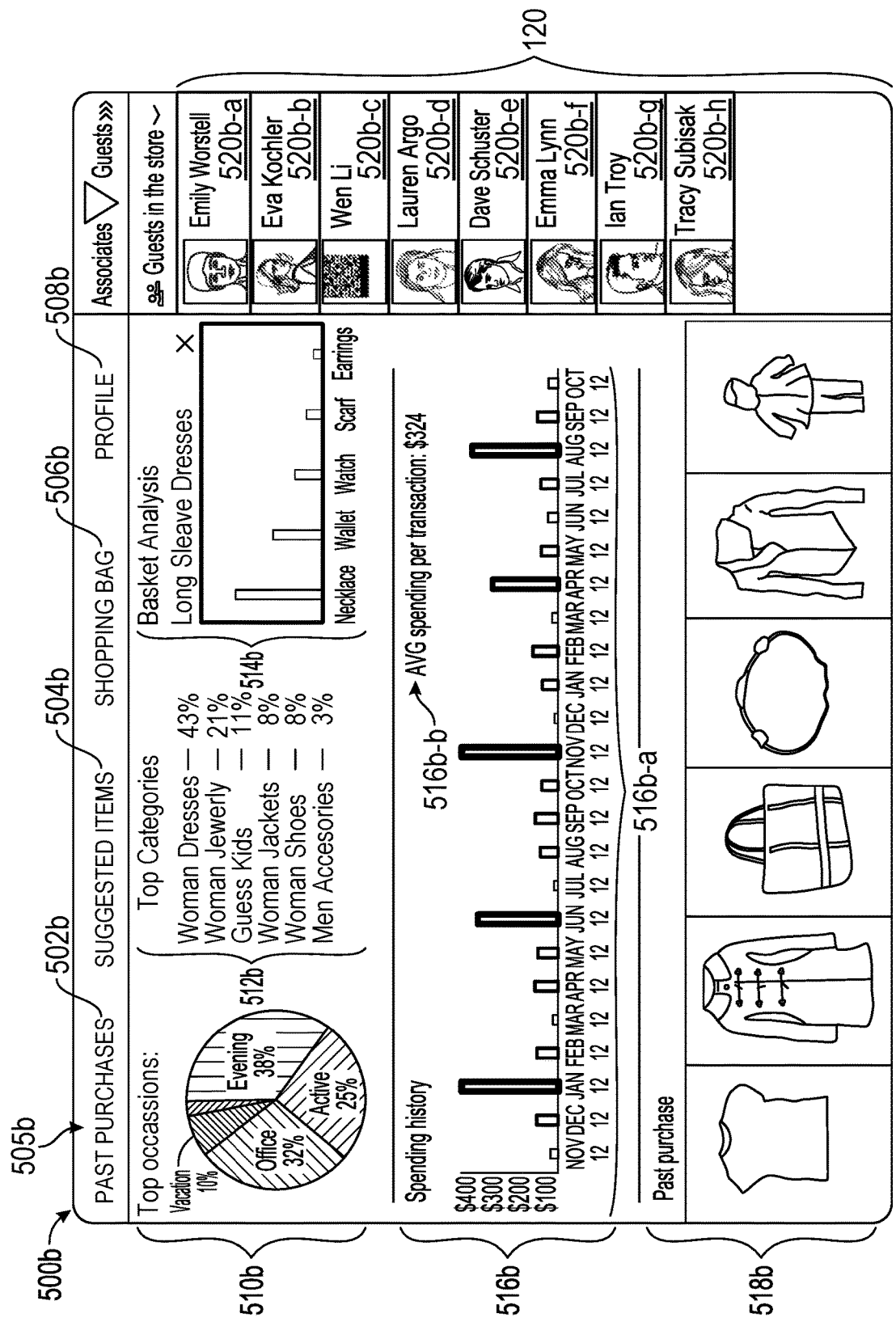

By way of example, FIG. 1B shows a user interface 500b of an intelligence dashboard also powered by an analytical in-memory data store. Interface 500b displays a customer report 505b to, e.g., a sales associate in a retail store. In an example, the sales associate can view the customer report 505b on a store computer.

In some examples, graphical user interface 500b includes customer portion 520b that displays information indicative of customers who are, e.g., in a particular geographic location (say, the retail store). Customer portion 520b displays customer information 520b-a to 520b-h, with each item of customer information 520b-a to 520b-h representing a customer. A user can select customer information 520b-a to 520b-h by, for example, using a mouse to click on, or using a touch screen display to touch, a desired item of customer information 520b-a to 520b-h. When an item of customer information 520b-a to 520b-h is selected, interface 500 displays information pertaining to the selected customer. In the interface 500, a viewer of graphical user interface 500, e.g., the sales associate, has opted to view information associated with the customer represented by customer information 520a.

A query execution engine can receive the user input, e.g., selection of customer information 520b-a to 520b-h, and execute queries to access the market intelligence data stored in an in-memory analytic data store. In some examples, the query execution engine can receive the accessed data (e.g., data from the in-memory analytic data that complies with the filter criteria 410a), perform analytics on the accessed data, and output the results of the analytics to user interface 500b.

As shown, interface 500b includes past purchases link 502b, selection of which causes interface 500b to display information indicative of past purchases of the customer that is selected via customer portion 520b. Interface 500b also includes suggested items link, selection of which causes interface 500b to display suggestions information 504b indicative of suggested items that a particular customer (e.g., the customer selected from customer portion 520b) may be interested in and want to purchase. Suggestions information 504b can based on analyzing data that is retrieved from an in-memory analytic data store. For example, suggestions information 504b can be based on customers' past purchases. Interface 500b includes shopping bag link 506b, selection of which causes graphical user interface 500b to display items that a particular customer wishes to purchase. Interface 500b includes profile link 508b, selection of which causes interface 500b to be updated to display a customer profile of a particular customer (e.g., the customer selected via currently present customer portion 520b).

Interface 500b includes top occasions portion 510b that displays information (e.g., a graph) indicative of the top occasions for which a particular customer (e.g., customer 520b-a) has purchased merchandise. Information for top occasions portion 510b can be generated based on analytics performed on market intelligence data contained in an in-memory data store. In this example, top occasions portion 510b is generated by tracking past purchases of the customer and then categorizing the types of purchase (e.g., based on various occasions). In another example, top occasions portion 510b displays information indicative of the top occasions for a group of customers, e.g., rather than displaying the top occasions for a particular customer.

Interface 500b also displays top categories information 512b, e.g., information specifying top categories of goods that have been purchased by a particular customer and/or by a group of customers at a retail store. Information for top categories portion 510b can be generated based on analytics performed on market intelligence data pertaining to the particular customer and/or the group of customers contained in an in-memory data store. In some implementations, interface 500b can include basket analysis portion 514b—for display of information indicative of types of goods that are currently in an electronic shopping cart of a customer.

Graphical user interface 500b also includes spending history portion 516b to display information indicative of how much money a particular customer (e.g., the customer selected in portion 520b) has spent with the retailer over a period of time. Information for spending history portion 516b can be generated based on analytics performed on market intelligence data pertaining to the particular customer contained in an in-memory data store. Spending history portion 516b can include a timeline 516b-a, e.g., a representation of the period of time over which spending is tracked. Spending history portion 516b also includes information 516b-b that specifies an average amount of money a particular customer has spent with the retailer over a period of time. Interface 500b also includes portion 518b for display of information indicative of past purchases and/or transactions of a particular customer.

Figure 2:
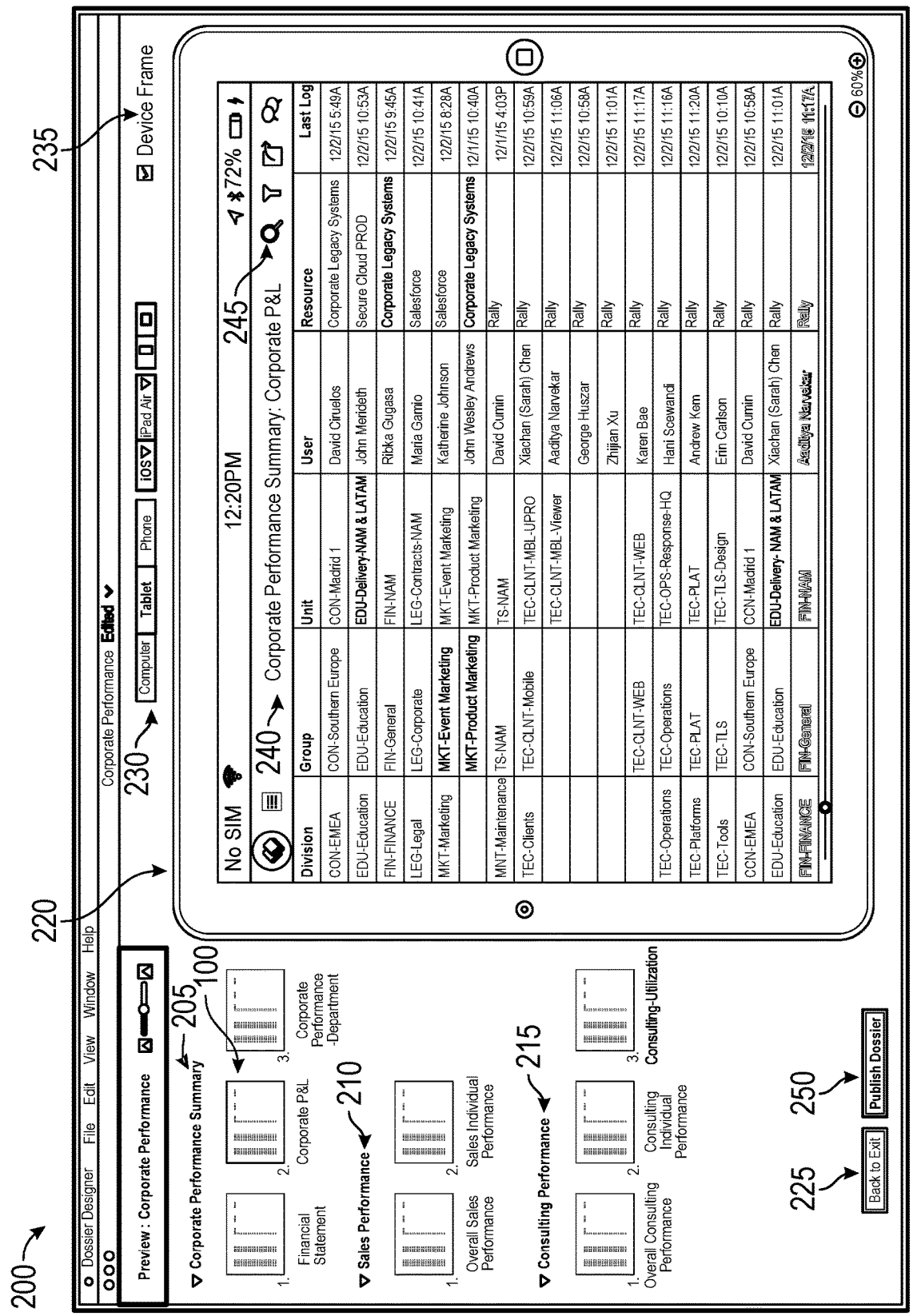
FIG. 2 illustrates an example dossier creation interface.

FIG. 2 illustrates an example dossier creation interface 200. The dossier creation interface 200 allows a user to assemble documents and dashboards for a dashboard to share with other users. The dossier creation interface 200 allows the creating user to mimic the viewing experience of users on different devices includes a collection of documents that are assembled by a user.

As shown in the dossier creation interface 200, the creating user has compiled dashboards and documents into different chapters 205, 210, and 215. The created user has entitled the dashboard 220 "Corporate Performance." Chapter 205 is related to corporate performance summary and includes three documents. Chapter 210 is related to sales performance and includes two documents. Chapter 215 is related to consulting performance and includes three documents. At any time during the creating of the dossier 220, the creating user may select button 225 to return to the dashboard and document creation interface to edit any to the documents in the chapters.

The dossier creation interface 200 provides options 230 for the user to visualize the viewing experience of any users who view the dossier 220. The options 230 allow the user to select the device, model, and operating system on which the user views the dossier 220. As shows the dossier creation interface 200, the creating user selected to visualize the experience of a user viewing the dossier 220 on an iPad Air tablet running iOS with a landscape orientation. The user may also select option 235 to visualize a frame of the selected device or only the screen of the selected device.

The dossier 220 displays the viewing experience of the user with whom the creating user shares the dossier. The dossier 220 includes a title 240 that indicates the title of the dossier, the chapter, and the document. The dossier 220 also includes tools 245 that allow the user to interact with the dossier other than viewing the dossier 220. For example, the tools 245 allow the user to zoom in on the data, filter the data, comment on the data, or share the data or dossier 220 with other users. Once the creating user has finished with the dossier, the creating user may select the publish button 250 to publish and share the dossier.

Figure 3:
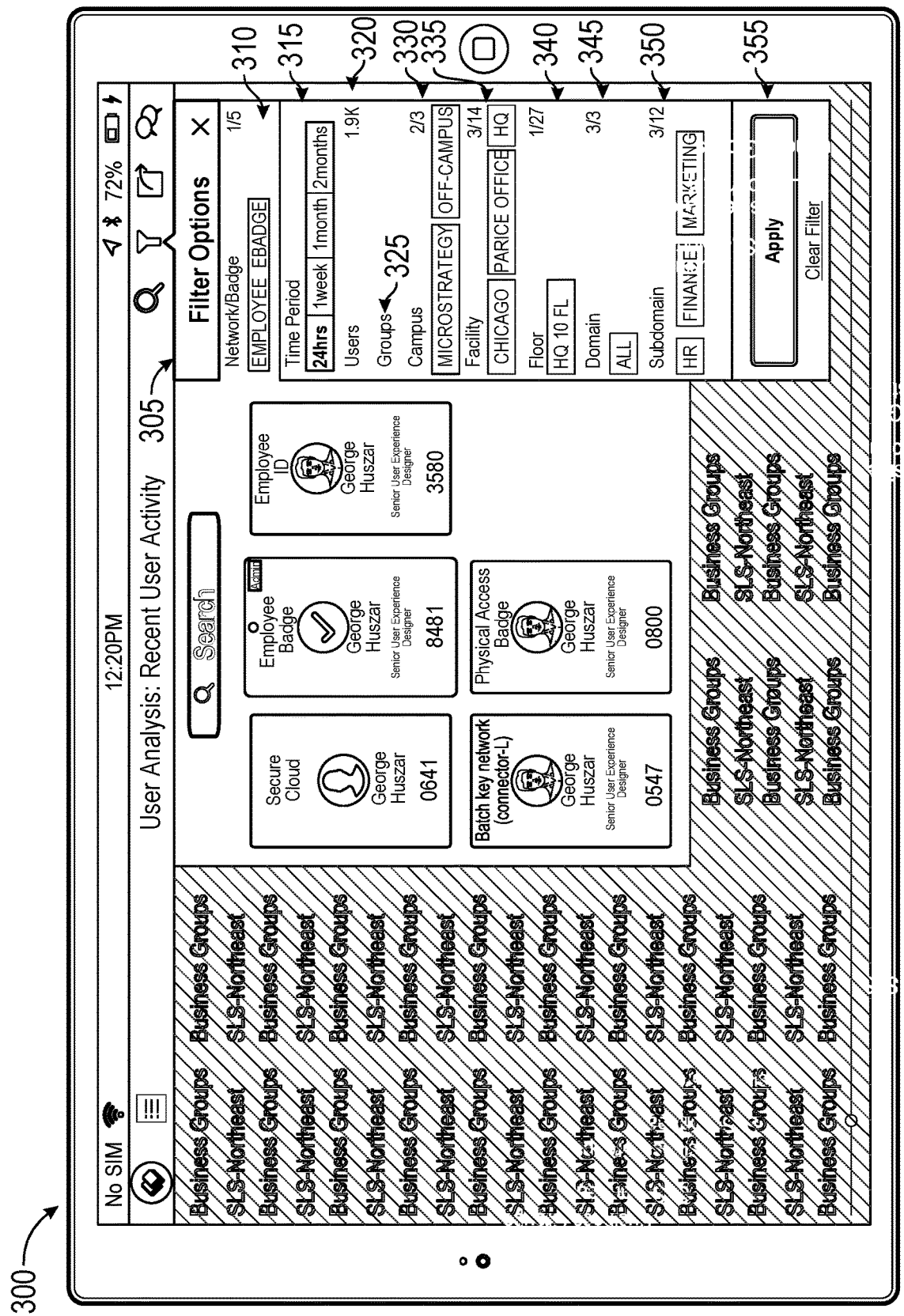
FIG. 3 illustrates an example interface for sharing a dossier.

FIG. 3 illustrates an example interface 300 for selecting users with whom to share a dossier. The interface 300 allows a user to select users based on a number of filters and then to publish the dossier to the selected group. The selected group can then view the dossier, annotate the dossier, and share the dossier with other users.

The interface 300 includes a filter menu 305 that includes the different parameters that the user can select to filter the users. The user can use filter 310 to select employees by viewing their badges. The badges may be electronic credentials that are administered by a credential management system. This technique may be helpful in instances where the badges include information that may not be otherwise accessible by other filters, such as a user's photo. The filter 315 allows users to filter based on time of recent activity of the user. The activity may be the last time the user used his or her badge or logged onto a server, such as server 105. The user number 320 indicates the number of users that currently are included in the filter parameters. The groups filter 325 allows the user to select users based on various groups that users may be assigned to. The campus filter 330 allows users to filter users based on campus to which the users are assigned. The campus filter 330 and other filters indicate the number of selections for the particular filter. For example, the campus filter 330 has two of three criteria selected. The facility filter 335 allows users to filter users based on a particular building or facility where a user works. Floor filter 340 allows for more specific filtering based on floors of the selected facility. Domain filter 345 allows users to filter based on a user's assigned domain. Similarly, subdomain filter 350 filters based on a user's assigned subdomain.

Once the user has selected the filters in the filter menu 305, the user may apply the filter by selecting the button 355. A list of users may then appear in the interface 300. The user may further select users from the list in the user interface 300 with whom to share the dossier or add users to the list. Once the creating user has a list of users to share the dossier with, the user may share and publish the dossier.

Figure 4:
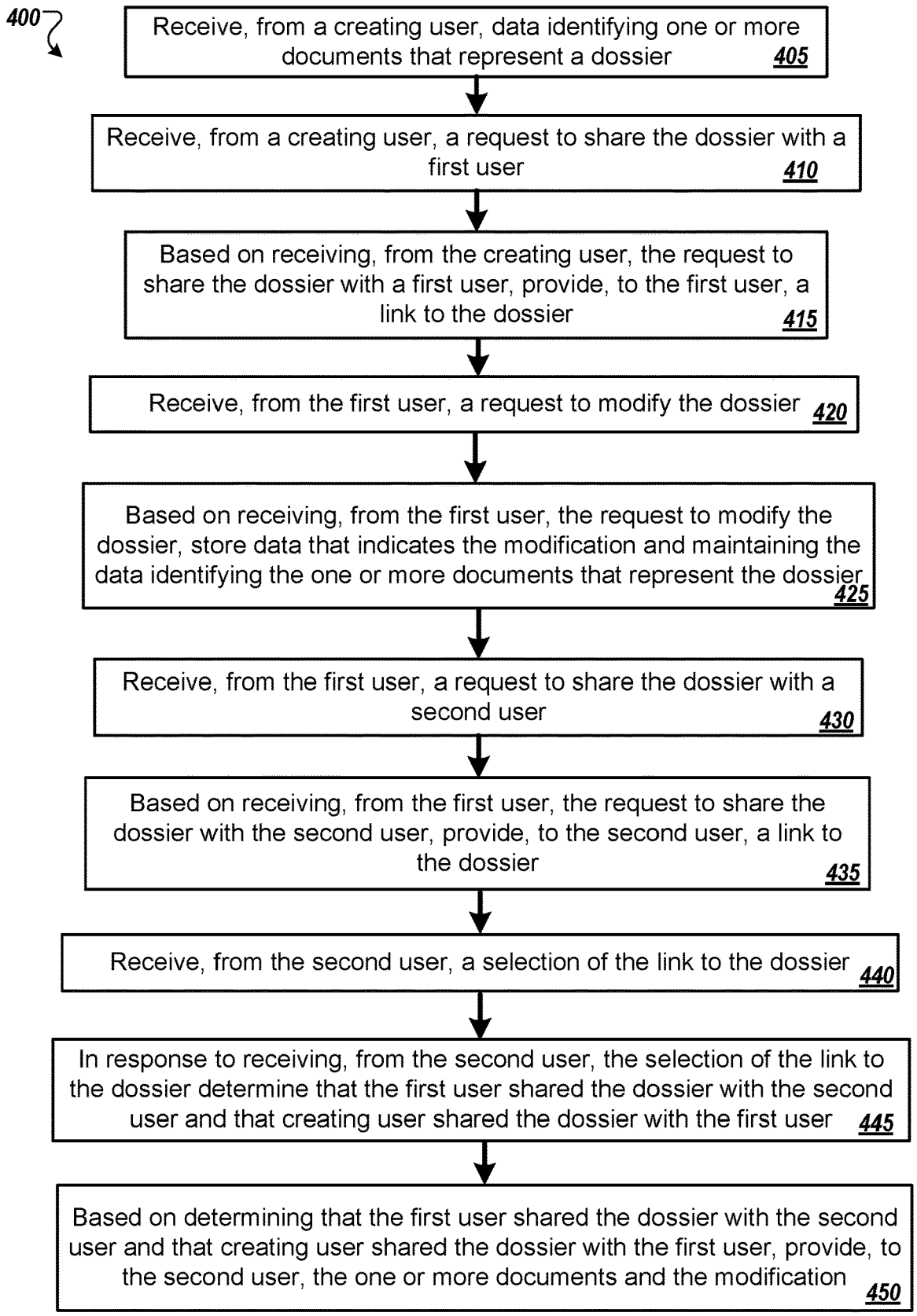
FIG. 4 illustrates an example process for creating and distributing a dossier.

FIG. 4 illustrates an example process 400 for creating and distributing a dossier. The operations of the process 400 are described generally as being performed by the server 105 of FIG. 1. In some implementations, operations of the process 400 may be performed by one or more processors included in one or more electronic devices.

The system receives, from a creating user, data identifying one or more documents (405). In some implementations, the documents are dashboards that include visualizations of analytics performed on unstructured data such as tables, spreadsheets, charts, graphs, accounting records, or any other type of document. The creating user requests that the system combine the documents into a dossier. In some implementations the system stores data indicating that the creating user created the dossier in response to receiving, from a creating user, data identifying one or more documents that represent a dossier. The system receives, from a creating user, a request to share the dossier with a first user (410). The system, based on receiving, from the creating user, the request to share the dossier with a first user, provides, to the first user, a link to the dossier (415).

The system receives, from the first user, a request to modify the dossier (420). In some implementations, the modification is an annotation or filtering of the displayed data or underlying data. The system, based on receiving, from the first user, the request to modify the dossier, stores data that indicates the modification and maintaining the data identifying the one or more documents that represent the dossier (425). In some implementations, the system stores data indicating that the first user provided the request to modify the dossier. In some implementations, the system stores the state of the underlying data at the time the first user requests the modification. For example, the system may store the state of the sales data when the user adds a comment related to a sales graph. The annotation may be related to adding a new sales chart that visualizes the underlying sales data in a way that is different than the original dossier. In this instance, the user may select whether to have a new sales chart that access the underlying data each time another user views with dossier or to have the new sales chart only illustrate the sales data in a state when the user created the new sales chart. In some implementations, the user may be prohibited from adding charts, graphs, table, annotations, or any other similar changes to the dossier, if the addition references data that is not referenced by the original dossier. In other words, the user can annotate, filter, or reorganize the dossier, but not add or remove underlying data sources. The system stores the annotation related data in a particular chapter in the dossier hierarchy that includes the link to the annotated document. In some implementations, the system may store the dossier annotations outside of each document in a central location. For example, the dossier may include an annotations file that lists data related to all of the annotations or the annotations may be included in the main dossier document, or the root of the hierarchy. In this instance, each dossier annotation may also include a document identifier that identifies the document in the dossier where the annotation belongs.

The system receives, from the first user, a request to share the dossier with a second user (430). When the system receives the request, the system may add data to the annotations added by the first user to indicate that the annotations are viewable by the second user. The system may also add data to the main dossier document to indicate that the second user is authorized to view the dossier. The request may include a level of access granted to the second user. The first user may specify that the second user is only able to view the dossier. The first user may specify that the second user is able to view, filter, annotate, and any other functionality provided by the dossier. The system, based on receiving, from the first user, the request to share the dossier with the second user, provides, to the second user, a link to the dossier (435). The link may be one that the second user can execute outside of the application that the creating user used to design the dossier. The link may include an application that is capable of viewing the dossier and the underlying data sources, but not adding or removing new data sources while preserving the ability of a user to annotate the dossier. The system receives, from the second user, a selection of the link to the dossier (440). The system, in response to receiving, from the second user, determines that the first user shared the dossier with the second user and that creating user shared the dossier with the first user (445). In some implementations, the system analyses the sharing data included in the dossier to determine which users shared the dossier with which users. The system may cross check the data for the main dossier document, or root, to determine if the second user is authorized. In some implementations, the system may determine that the second user is not authorized to access the dossier. In this case, the system may notify the creating user and prompt the creating user whether the second user should access the dossier. The creating user may grant access to the second user to view the dossier and the system adds data indicating that the second user is an authorized user. The creating user may also deny access.

The system, based on determining that the first user shared the dossier with the second user and that creating user shared the dossier with the first user, provides, to the second user, the one or more documents and the modification (450). In some implementations, after the creating user has shared the dossier and possibly after the first user has shared the dossier, the system receives, from the creating user, data identifying an additional document to include in the dossier. In this instance, the first user and the second user will then see the additional document when each user views the dossier. In some implementations, a sharing user, such as the creating user, can see annotations made by a user who received the dossier from the sharing user. For example, the creating user can view the annotations made by the first user. In some implementations, the creating user cannot view the annotations made by the first user.

In some implementations, the system receives, from the creating user, a request to share the dossier with a third user. The system, based on receiving, from the creating user, the request to share the dossier with the third user, provides, to the third user, a link to the dossier. The system receives, from the third user, a selection of the link to the dossier. The system, in response to receiving, from the third user, determines that the creating user shared the dossier with the third user. The system, based on determining that the creating user shared the dossier with the third user, providing, to the third user, the one or more documents and not the modification. As an example, the creating user, at time after creating the dossier, shares the dossier with the third user. The third user is similar to the first user in that the third user received the dossier directly from the creating user. To update the dossier, the system adds the third user to the list of users who can view the dossier and notes that the creating user shared the dossier with the third user. In some implementations, the third user is not able to view the annotations of the first or second users because the first or second users did not share the dossier with the third user. In some implementations, third user is able to view the annotations of the first or second users because the first or second users did not share the dossier with the third user.

In some implementations, the system receives, from the second user, a request to share the dossier with a fourth user. The system, based on receiving, from the second user, the request to share the dossier with the fourth user, provides, to the fourth user, a link to the dossier. The system receives, from the fourth user, a selection of the link to the dossier. The system, in response to receiving, from the third user, determines that the creating user shared the dossier with the first user, that the first user shared the dossier with the second user, and that the second user shared the dossier with the fourth user. The system, based on determining that the creating user shared the dossier with the first user, that the first user shared the dossier with the second user, and that the second user shared the dossier with the fourth user, provides, to the fourth user, the one or more documents and the modification. In this instance, the fourth user's relationship with the second user is similar to the second user's relationship with the first user. The fourth user can see the annotations of the second user as well as any changes made to the original dossier by the creating user. In some implementations, the fourth user can see the annotations of the first user. In some implementations, annotations are only viewable by users who receive a shared dossier directly from the annotating user. For example, the fourth user could see the second user's annotations, but not the first user's annotations.

In some implementations, each dossier may include search capabilities that allow users to search dossiers shared with the searching user according to dossier title, reports, documents, or dashboards included in the dossier, or chapter titles. Users may also be able to search dossiers that have not been shared with a searching user. A user may identify, through searching, a particular dossier, and may request that a user who can share the dossier, such as the creating user, share the particular dossier with the searching user. In some implementations, the system includes a recommendation engine that recommends dossiers to users based on their activity, such as viewing and searching activity. The recommended dossiers may be ones shared with the user or the user may be able to request access to the recommended dossiers. In some implementations, a user viewing a dossier may be able to interact with other users who also have access to the dossier. The users may interact through chat, voice communication, or other communication channels. The users may provide each other proposed annotations without saving the annotations to the server.

Figure 6:

FIG. 6 illustrates an example interface 600 for a dossier. The dossier in interface 600 includes a number of chapters and subchapters. The overall theme of the dossier is corporate performance, and it includes chapters related a summary, sales, and consulting. Each of the chapters includes a number of documents or dashboard or both. The dossier includes a number of filter options listed at the bottom of the interface 600. For example, for any of the documents or dashboards, the user may filter by quarter or by department. Any of the filters selected by the user may be stored in the dossier in association with the user's identifying information.

Figure 7:
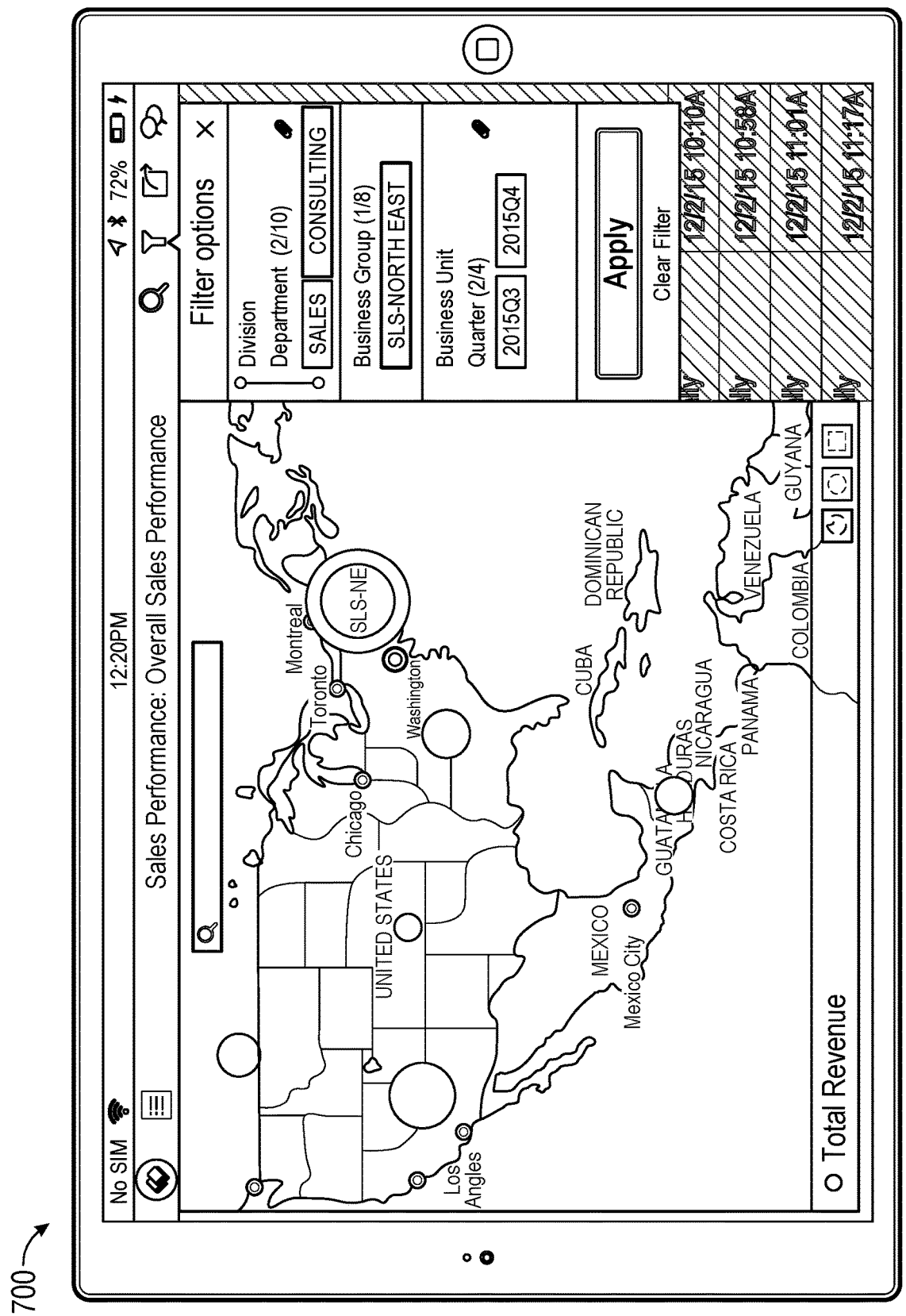

FIG. 7 illustrates an example interface 700 for filtering a dossier. The interface 700 illustrates a map and allows the user to select different regions on the map as filters for the dossier. For example, the user may select the southwest region to filter the data displayed on the interface. The interface 700 also illustrates the underlying data by representing the size of the revenue for each region as a circle with a diameter proportional to the revenue.

In some implementations, the interface 700 may include options to delete a page or chapter, add a page or chapter, and/or search the dossier. The user may add or delete pages or chapters in a similar manner to filtering the pages or chapters. The system stores an annotations file that includes the filters, deletions, and additions that a user makes to the dossier. The underlying dossier file is unaffected. The searching option may include a selectable option to initiate a search of the pages and/or chapters of the dossier. In instances where the user is interacting with a modified or annotated dossier, the searching tool searches the modified or annotated dossier.

FIG. 8 illustrates an example interface 800 for sharing a dossier and interacting with other users. The interface 800 includes a dialog box that allow the user to communicate with another user. The user may select a user by interacting with the dossier. For example, the dossier may be related to the amount of revenue that each employee was responsible for. In this instance, the user may select an employee from the list to begin communicating with that user. As another example, the user may select the dialog bubbles in the upper right portion of the interface 800 to display a list of users to interact with. In some implementations the dialog bubbles or selecting users listed in the dossier brings up a dialog box for sharing the dossier.

Figure 9:
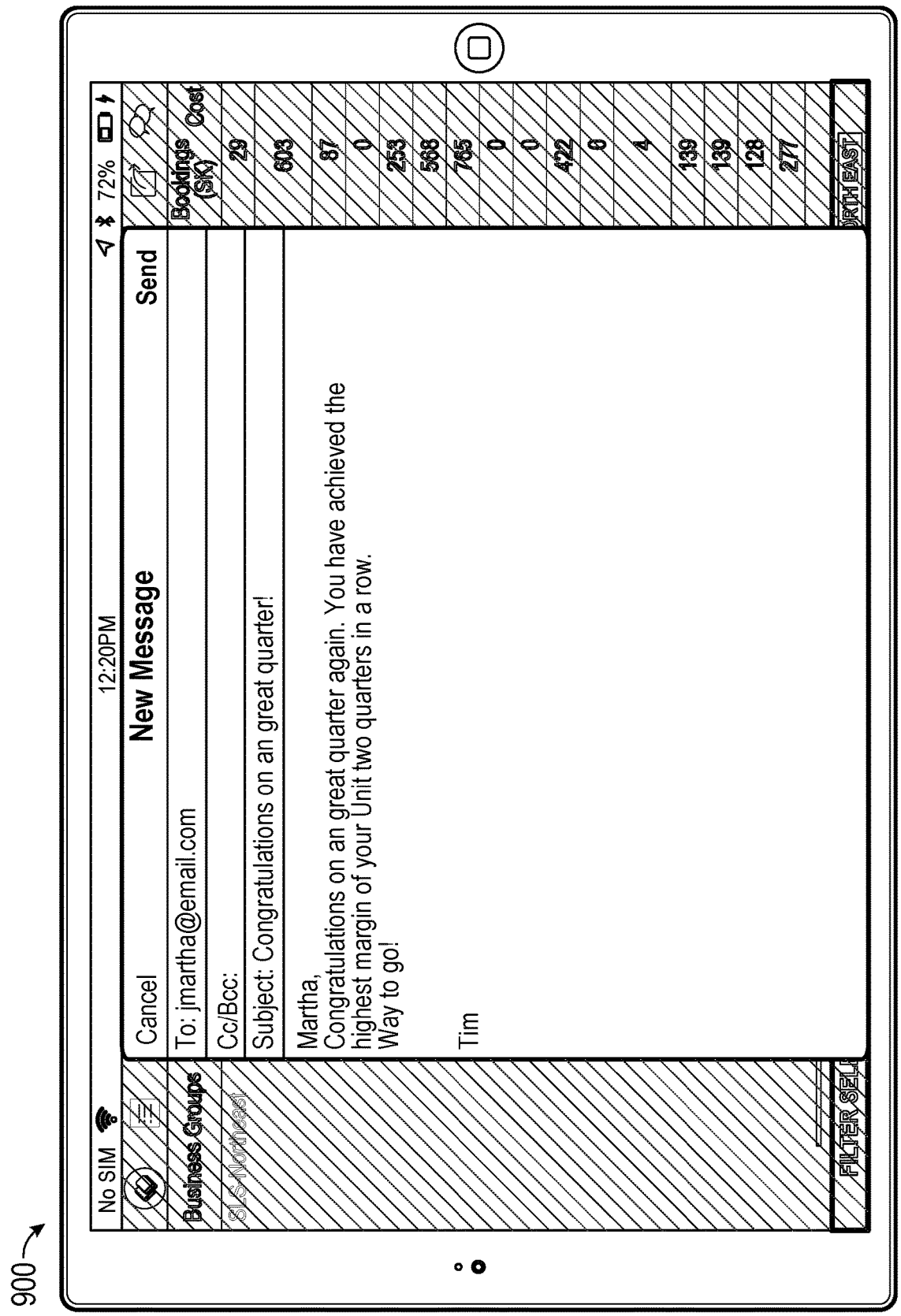

FIG. 9 illustrates an example interface 900 for interacting with users through a dossier. The interface 900 includes an email window where the user can type a message to another user. The interface 900 may also include an option for the user to share the dossier with the receiving user. In this instance, the system adds data to the dossier to indicate that the user shared the dossier with the receiving user.

Figure 10:
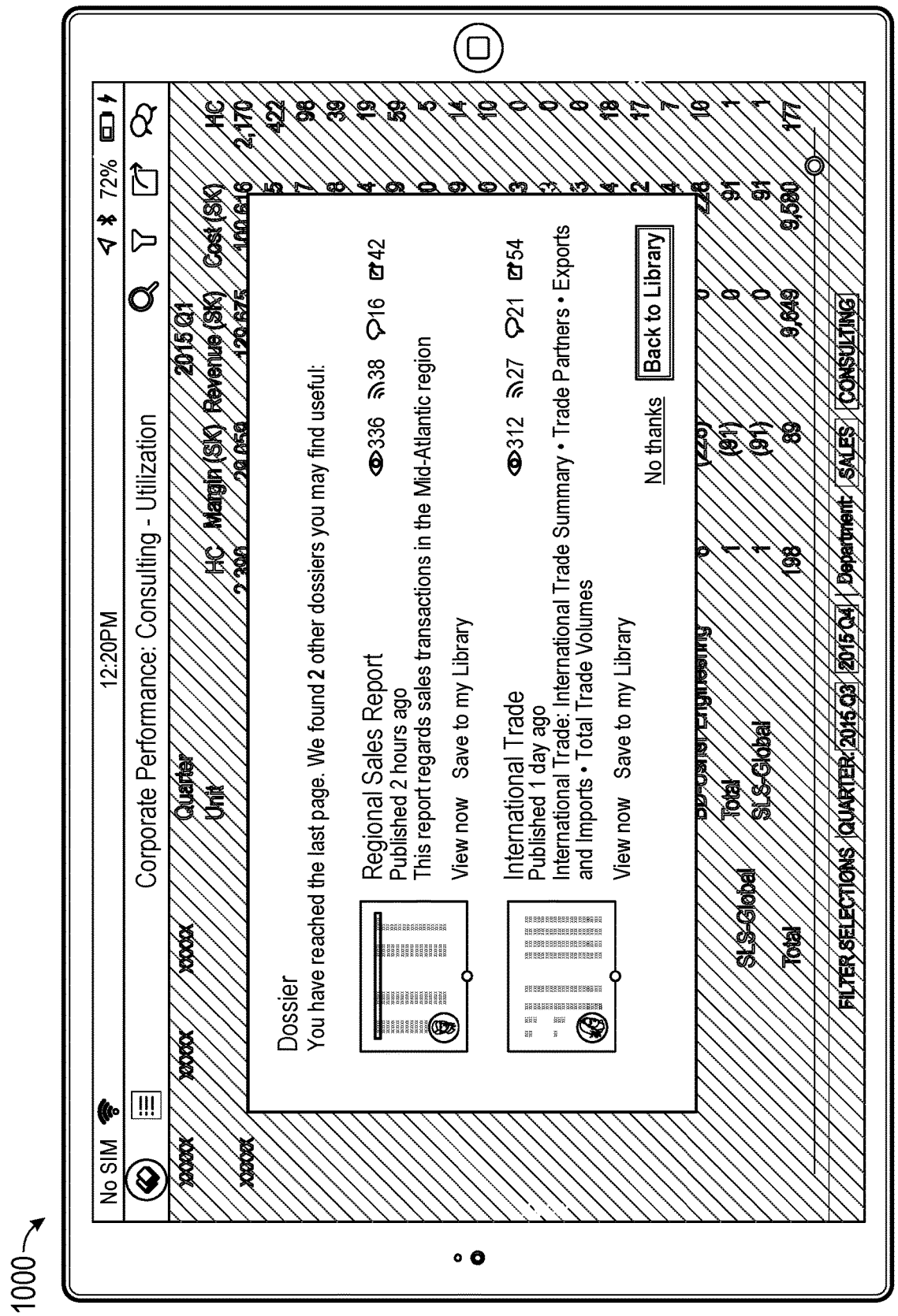

FIG. 10 illustrates an example interface 1000 for sharing and locating other dossiers. Direct user to user sharing is one way to distribute dossiers. Another way is for the system to identify dossiers that are similar to the dossiers views by a particular user. The system may identify similar dossiers based on a similarity of the underlying data, the type of analysis performed in the documents or dashboards, or data entered by a user who created the dashboard. In some implementations, the system may only identify dossiers that have been shared with the user. In some implementations, the system may identify dossiers that have not been shared with the user. In this instance, the user may have to request permission to view the dossier from the creating user or from a user who is able to share the dossier.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any innovations or of what may be claimed, but rather as descriptions of features specific to particular embodiments of particular innovations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A computer-implemented method comprising:
storing a document;
storing view objects for different users, wherein the view objects respectively indicate modifications to the document made by the different users;
providing, to a first user, a first link that includes an identifier for a first view object of the view objects, the link being configured to provide access to a modified version of the document in which modifications in a subset of the view objects are applied to the document, the subset being determined based on a sequence in which the document was shared among users, the sequence including sharing the document with the first user;

receiving, from the first user, a request to modify the document and data identifying a modification to the document;

based on receiving, from the first user, the request to modify the document and the data identifying the modification to the document, generating a second view object that indicates the modification requested by the first user and is stored separately from the document, while maintaining the document in an unchanged state, wherein the second view object includes a reference to the first view object;

receiving, from the first user, a request to share the document with a second user;

based on receiving, from the first user, the request to share the document with the second user, providing, to the second user, a second link that includes an identifier for the second view object, wherein the second link is configured to provide access to a modified view of the document generated by (i) applying modifications indicated in the second view object identified in the second link, and (ii) based on the second view object including the reference to the first view object, applying modifications indicated in the first view object;

receiving, from the second user, a request to share the document with a third user;

based on receiving, from the second user, the request to share the document with the third user, providing, to the third user, a third link that includes the identifier for the second view object;

receiving, from the third user, a selection of the third link; and in response to receiving, from the third user, the selection of the third link, providing, to the third user, the modified view of the document generated by (i) applying modifications indicated in the second view object identified in the third link, and (ii) based on the second view object including the reference to the first view object, applying modifications indicated in the first view object.

2. The method of claim 1, wherein generating the second view object that indicates the modification requested by the first user and is stored separately from the document, while maintaining the document in an unchanged state comprises:
storing data indicating that the first user provided the request to modify the document and the data identifying the modification to the document.

3. The method of claim 1, comprising:
storing data that identifies a creating user that created the document.

4. The method of claim 1, wherein the modification by the first user comprises filtering or annotating.

5. The method of claim 1, wherein the document comprises one or more dashboards that include visualizations of analytics performed on unstructured data.

6. The method of claim 1, comprising:
receiving, from the second user, a selection of the second link; and
in response to receiving, from the second user, the selection of the second link, providing, to the second user, a view that includes the modifications indicated in the second view object and the modifications indicated in the first view object applied to the document in the unchanged state.

7. The method of claim 1, wherein:
the modification requested by the first user comprises filtering, and the method further comprises:
receiving, from the second user, a selection of the second link; and
in response to receiving, from the second user, the selection of the second link, providing, to the second user, a view that includes the filter applied to the document in the unchanged state.

8. The method of claim 1, comprising determining the subset of the modifications based on a sequence in which the document was shared among multiple of the different users prior to being shared with the first user.

9. The method of claim 1, comprising determining the subset of the modifications to the document such that the subset (i) includes modifications to the document made by users in a sequence of sharing the document, from one user to another, from a creating user that created the document to the first user and (ii) excludes modifications to the document made by one or more users that are not involved in a chain of sharing the document in the sequence from the creating user to the first user.

10. The method of claim 1, wherein storing the view objects for the different users comprises storing data indicating the respective modifications to the document in association with user identifiers for the different users that made the respective modifications.

11. The method of claim 1, wherein generating the second view object comprises:
determining a user identifier corresponding to the first user;
generating an object identifier corresponding to the modification;
associating the user identifier and the object identifier with a document identifier of the document in the unchanged state; and
storing the associated user identifier and the object identifier.

12. The method of claim 1, wherein the modification to the document requested by the first user is a first modification; and
wherein the method comprises:
after providing, to the second user, the second link, receiving, from the first user, a second request to modify the document and data identifying a second modification;
based on receiving, from the first user, the second request to modify the document and the data identifying the second modification to the document, altering the second view object to indicate the second modification;
after altering the second view object, receiving, from the second user, data indicating a selection of the second link; and
in response to receiving, from the second user, the data indicating the selection of the second link, providing, to the second user, a view of the document that applies the modifications in the subset of the view objects, the first modification by the first user, and the second modification by the first user.

13. The method of claim 1, wherein storing the document comprises storing a master version of the document, wherein views of the document generated using each of the view objects are based on the stored master version of the document; and
wherein the master version of the document and the view objects are arranged such that changes to the master version of the document are propagated to views of the document subsequently generated using each of the view objects corresponding to the document.

14. The method of claim 1, wherein providing the second link comprises providing a link that includes (i) an identifier for the document and (ii) the identifier for the second view object.

15. The method of claim 1, wherein the first view object indicates one or more modifications to the document by a particular user associated with the first view object;
   wherein the first view object includes a reference to at least one other view object associated with a user that shared the document with the particular user; and
   wherein the subset of the view objects includes the first view object and the at least one other view object.

16. A system comprising:
   one or more computers and one or more storage devices storing instructions that are operable, when executed by the one or more computers, to cause the one or more computers to perform operations comprising:
      storing a document;
      storing view objects for different users, wherein the view objects respectively indicate modifications to the document made by the different users;
      providing, to a first user, a first link that includes an identifier for a first view object of the view objects, the link being configured to provide access to a modified version of the document in which modifications in a subset of the view objects are applied to the document, the subset being determined based on a sequence in which the document was shared among users, the sequence including sharing the document with the first user;
      receiving, from the first user, a request to modify the document and data identifying a modification to the document;
      based on receiving, from the first user, the request to modify the document and the data identifying the modification to the document, generating a second view object that indicates the modification requested by the first user and is stored separately from the document, while maintaining the document in an unchanged state, wherein the second view object includes a reference to the first view object;
      receiving, from the first user, a request to share the document with a second user;
      based on receiving, from the first user, the request to share the document with the second user, providing, to the second user, a second link that includes an identifier for the second view object, wherein the second link is configured to provide access to a modified view of the document generated by (i) applying modifications indicated in the second view object identified in the second link, and (ii) based on the second view object including the reference to the first view object, applying modifications indicated in the first view object;
      receiving, from the second user, a request to share the document with a third user;
      based on receiving, from the second user, the request to share the document with the third user, providing, to the third user, a third link that includes the identifier for the second view object;
      receiving, from the third user, a selection of the third link; and
      in response to receiving, from the third user, the selection of the third link, providing, to the third user, the modified view of the document generated by (i) applying modifications indicated in the second view object identified in the third link, and (ii) based on the second view object including the reference to the first view object, applying modifications indicated in the first view object.

17. The system of claim 16, wherein generating the second view object that indicates the modification requested by the first user and is stored separately from the document, while maintaining the document in an unchanged state comprises:
   storing data indicating that the first user provided the request to modify the document and the data identifying the modification to the document.

18. One or more non-transitory computer-readable media storing software comprising instructions executable by one or more computers which, upon such execution, cause the one or more computers to perform operations comprising:
   storing a document;
   storing view objects for different users, wherein the view objects respectively indicate modifications to the document made by the different users;
   providing, to a first user, a first link that includes an identifier for a first view object of the view objects, the link being configured to provide access to a modified version of the document in which modifications in a subset of the view objects are applied to the document, the subset being determined based on a sequence in which the document was shared among users, the sequence including sharing the document with the first user;
   receiving, from the first user, a request to modify the document and data identifying a modification to the document;
   based on receiving, from the first user, the request to modify the document and the data identifying the modification to the document, generating a second view object that indicates the modification requested by the first user and is stored separately from the document, while maintaining the document in an unchanged state, wherein the second view object includes a reference to the first view object;
   receiving, from the first user, a request to share the document with a second user;
   based on receiving, from the first user, the request to share the document with the second user, providing, to the second user, a second link that includes an identifier for the second view object, wherein the second link is configured to provide access to a modified view of the document generated by (i) applying modifications indicated in the second view object identified in the second link, and (ii) based on the second view object including the reference to the first view object, applying modifications indicated in the first view object;
   receiving, from the second user, a request to share the document with a third user;
   based on receiving, from the second user, the request to share the document with the third user, providing, to the third user, a third link that includes the identifier for the second view object;
   receiving, from the third user, a selection of the third link; and
   in response to receiving, from the third user, the selection of the third link, providing, to the third user, the modified view of the document generated by (i) applying modifications indicated in the second view object identified in the third link, and (ii) based on the second view object including the reference to the first view object, applying modifications indicated in the first view object.

\* \* \* \* \*